United States Patent
Song (10) Patent No.: US 11,577,730 B2
(45) Date of Patent: Feb. 14, 2023

(54) VEHICLE AND CONTROL METHOD THEREOF

(71) Applicant: HL Klemove Corp., Pyeongtaek (KR)

(72) Inventor: Seungmok Song, Seongnam (KR)

(73) Assignee: HL Klemove Corp., Incheon (KR)

( * ) Notice: Subject to any disclaimer, the term of this patent is extended or adjusted under 35 U.S.C. 154(b) by 113 days.

(21) Appl. No.: 17/121,958

(22) Filed: Dec. 15, 2020

(65) Prior Publication Data

US 2021/0188277 A1  Jun. 24, 2021

(30) Foreign Application Priority Data

Dec. 20, 2019  (KR) ........................ 10-2019-0172254

(51) Int. Cl.
*B60W 30/12* (2020.01)
*B60W 30/14* (2006.01)
(Continued)

(52) U.S. Cl.
CPC ...... *B60W 30/18163* (2013.01); *B60W 30/12* (2013.01); *B60W 30/16* (2013.01);
(Continued)

(58) Field of Classification Search
CPC ........... B60W 30/18163; B60W 30/12; B60W 30/16; B60W 2554/4045; B60W 2554/80; B60W 2554/802; B60W 2554/804; B60W 60/001; B60W 30/14; B60W 40/02; B60W 40/10; B60W 2554/801; B60Y 2300/14;
(Continued)

(56) References Cited

U.S. PATENT DOCUMENTS

| | | | |
|---|---|---|---|
| 2018/0293894 A1* | 10/2018 | Zhang | B60W 30/10 |
| 2019/0369616 A1* | 12/2019 | Ostafew | B60W 60/00274 |
| 2020/0247416 A1* | 8/2020 | Tsuji | B60W 50/10 |

FOREIGN PATENT DOCUMENTS

| | | |
|---|---|---|
| JP | 6103716 B2 | 3/2017 |
| JP | 6285809 B2 | 2/2018 |

* cited by examiner

*Primary Examiner* — Abby Y Lin
*Assistant Examiner* — Hossam M Abd El Latif
(74) *Attorney, Agent, or Firm* — Harvest IP Law LLP (57) ABSTRACT

The present disclosure relates to a vehicle and control method thereof, to a vehicle having a driver assistance system for assisting a driver. When a lane change is requested even though it does not meet the predetermined lane change condition, present disclosure provides a vehicle driver assistance system (ADAS) that can actively indicate a lane change intention to an adjacent vehicle through 'deflected driving in a lane' and perform lane change safely after confirming the yield/overtake intention of the adjacent vehicle. It is an aspect of the present disclosure to provide a control method of a vehicle, including: confirming whether the surrounding situation of the vehicle satisfies a lane change condition when a lane change command occurs while the vehicle is driving autonomously; performing deflected driving in the lane of the vehicle to indicate a lane change intention when the surrounding situation of the vehicle does not satisfy the lane change condition; and performing a lane change corresponding to the lane change command when the yield intention for the lane change intention is confirmed from another vehicle around the traveling lane after indicating the lane change intention through the deflected driving.

12 Claims, 8 Drawing Sheets

(51) Int. Cl.
  *B60W 30/16* (2020.01)
  *B60W 30/18* (2012.01)
  *B60W 40/02* (2006.01)
  *B60W 40/10* (2012.01)
  *B60W 60/00* (2020.01)
  *G08G 1/16* (2006.01)

(52) U.S. Cl.
  CPC .............. *G08G 1/163* (2013.01); *G08G 1/167* (2013.01); *B60W 2554/4045* (2020.02); *B60W 2554/80* (2020.02)

(58) Field of Classification Search
  CPC ......... B60Y 2300/18166; G08G 1/163; G08G 1/167
  USPC .......................................................... 701/96
  See application file for complete search history.

VEHICLE AND CONTROL METHOD THEREOF

CROSS-REFERENCE TO RELATED APPLICATION

This application is based on and claims priority under 35 U.S.C. § 119 to Korean Patent Application No. 2019-0172254, filed on Dec. 20, 2019 in the Korean Intellectual Property Office, the disclosure of which is incorporated herein by reference.

BACKGROUND

1. Field

The present disclosure relates to a vehicle, and to a vehicle having a driver assistance system for assisting a driver.

2. Description of the Related Art

Generally, a vehicle refers to a movement device or transportation device, designed to travel on a road or railway using fossil fuel, electric power, and the like as a power source. The vehicle may move to various positions mainly using one or more wheels installed on the vehicle body. Such a vehicle may include a three-wheeled or four-wheeled vehicle, a two-wheeled vehicle, such as a motorcycle, a construction machine, a bicycle, and a train traveling on a railway arranged on a track.

Vehicles are the most common means of transportation in modern society, and the number of people using them is increasing. Due to the development of vehicle technology, long-distance movement is easy and life is easier. However, in places with a high population density, road traffic conditions deteriorate and traffic congestion often occurs.

Recently, there have been active studies on a vehicle equipped with an advanced driver assist system (ADAS), which actively provides information about the state of a vehicle, the state of a driver, and the surrounding environment to reduce the burden on the driver while enhancing the convenience of the driver.

ADAS includes 'Autonomous Emergency Braking (AEB)', which reduces or stops the vehicle's velocity by itself even if the driver does not operate the brake system in case of a collision risk, 'Lane Keep Assist System (LKAS)', which maintains the lane by adjusting the driving direction when the line deviates, 'Advanced Smart Cruise Control (ASCC)', which maintains an adequate distance with the preceding vehicle while driving at a preset velocity, 'Active Blind Spot Detection (ABSD)', which detects the risk of collision in blind spots and helps to change lanes safely, and 'Around View Monitor (AVM)' that visually shows the situation around the vehicle.

In particular, ABSD detects adjacent vehicles in the rear blind spot and displays an alarm on the side mirror of the own vehicle, and when the driver tries to change lanes without seeing the blind spot vehicle, prevents accidents by the ECU actively intervening in vehicle control.

However, while the ABSD function is operating, even though lane change is necessary, if there is not enough space in the left (or right) lane to enter due to other vehicles, the ECU does not attempt to change lanes for safety. If a lane change is absolutely required at the location (e.g., a lane change is necessary to enter a toll gate on a highway), if the lane change is not performed, inconvenience may occur, such as not being able to drive along a desired route or having to detour a long way to reach a destination.

SUMMARY

According to an aspect of the present disclosure, when a lane change is requested despite not meeting a predetermined lane change condition, the present disclosure provides a vehicle driver assistance system that can actively indicate lane change intentions to adjacent vehicles through 'deflected driving in a lane' and safely performs lane change after confirming the intention to yield/overtake adjacent vehicles.

Therefore, it is an aspect of the present disclosure to provide a control method of a vehicle, including: confirming whether the surrounding situation of the vehicle satisfies a lane change condition when a lane change command occurs while the vehicle is driving autonomously; performing deflected driving in the lane of the vehicle to indicate a lane change intention when the surrounding situation of the vehicle does not satisfy the lane change condition; and performing a lane change corresponding to the lane change command when the yield intention for the lane change intention is confirmed from another vehicle around the traveling lane after indicating the lane change intention through the deflected driving.

The performing deflected driving in the lane may include: driving the vehicle to be biased toward a left line or a right line of the lane without leaving the traveling lane.

The performing deflected driving in the lane may include: when changing the lane to the left lane of the traveling lane, driving to be biased toward the left line of the traveling lane; and when changing the lane to the right lane of the traveling lane, driving to be biased toward the right line of the traveling lane.

The confirming the yield intention may include: Confirming the yield intention of another vehicle from increasing the relative distance between the vehicle and another vehicle through deceleration of another vehicle around the vehicle.

The control method may further include: confirming once more whether the surrounding situation of the vehicle satisfies a lane change condition after confirming the yield intention and before performing lane change.

It is an aspect of the present disclosure to provide a vehicle including: a driver assistance system configured to control autonomous driving of the vehicle; and a controller configured to confirm whether the surrounding situation of the vehicle satisfies a lane change condition when a lane change command occurs while the vehicle is driving autonomously, perform deflected driving in the lane of the vehicle to indicate a lane change intention when the surrounding situation of the vehicle does not satisfy the lane change condition; and perform a lane change corresponding to the lane change command when the yield intention for the lane change intention is confirmed from another vehicle around the traveling lane after indicating the lane change intention through the deflected driving.

The deflected driving in the lane may include: driving the vehicle to be biased toward a left line or a right line of the lane without leaving the traveling lane.

The deflected driving in the lane may include: when changing the lane to the left lane of the traveling lane, driving to be biased toward the left line of the traveling lane; and when changing the lane to the right lane of the traveling lane, driving to be biased toward the right line of the traveling lane.

The controller may be configured to confirm the yield intention of another vehicle from increasing the relative distance between the vehicle and another vehicle through deceleration of another vehicle around the vehicle.

The controller may be configured to confirm once more whether the surrounding situation of the vehicle satisfies a lane change condition after confirming the yield intention and before performing lane change.

It is an aspect of the present disclosure to provide a control method of a vehicle, the method including: performing centering control to allow the vehicle to autonomously drive along the center of the lane; confirming whether the surrounding situation of the vehicle satisfies a lane change condition when a lane change command occurs while the vehicle is driving autonomously; controlling the vehicle to drive in a biased direction toward a left line or a right line of the lane without leaving the traveling lane to indicate a lane change intention when the surrounding situation of the vehicle does not satisfy the lane change condition; confirming the yield intention for the lane change intention from another vehicle around the traveling lane after indicating the lane change intention through the deflected driving; confirming once more whether the surrounding situation of the vehicle satisfies a lane change condition before performing lane change when confirming the yield intention from another vehicle; and performing a lane change corresponding to the lane change command when the surrounding situation of the vehicle satisfies the lane change condition.

The confirming the yield intention may include: onfirming the yield intention of another vehicle from increasing the relative distance between the vehicle and another vehicle through deceleration of another vehicle around the vehicle.

It is an aspect of the present disclosure to provide a vehicle including: a driver assistance system configured to control autonomous driving of the vehicle; and a controller configured to perform centering control to allow the vehicle to autonomously drive along the center of the lane, confirm whether the surrounding situation of the vehicle satisfies a lane change condition when a lane change command occurs while the vehicle is driving autonomously, control the vehicle to drive in a biased direction toward a left line or a right line of the lane without leaving the traveling lane to indicate a lane change intention when the surrounding situation of the vehicle does not satisfy the lane change condition, confirm the yield intention for the lane change intention from another vehicle around the traveling lane after indicating the lane change intention through the deflected driving and perform a lane change corresponding to the lane change command when confirming the yield intention from another vehicle.

The controller may be configured to confirm the yield intention of another vehicle from increasing the relative distance between the vehicle and another vehicle through deceleration of another vehicle around the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Figure 1:
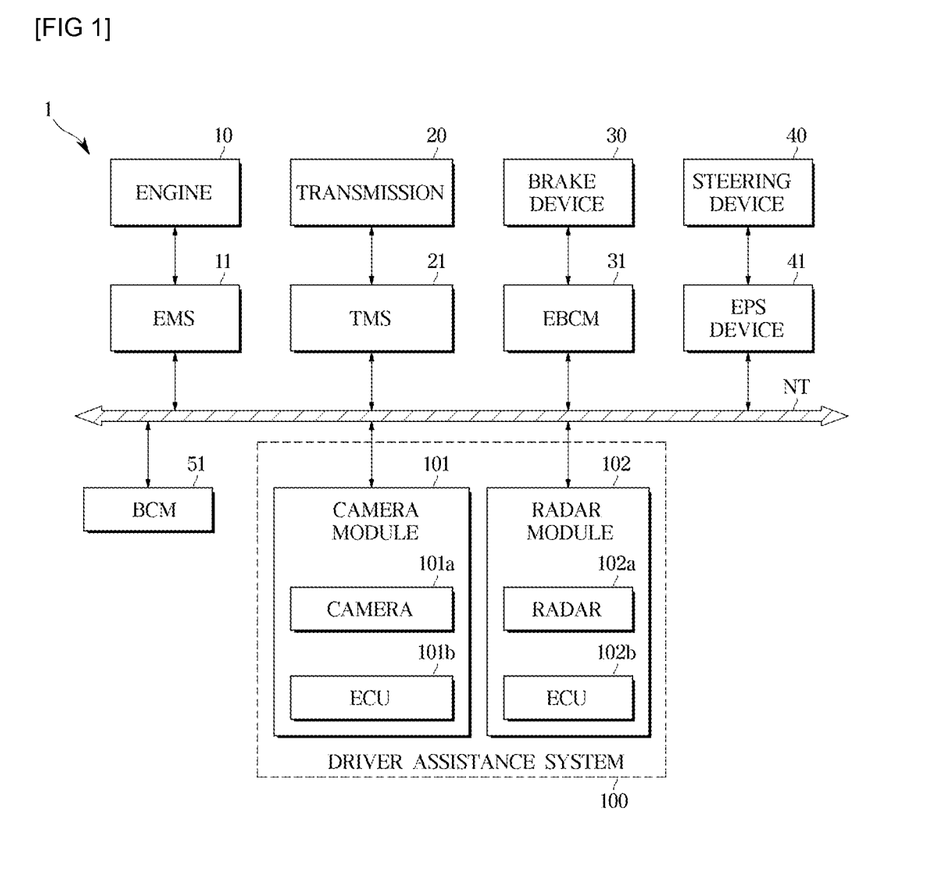
FIG. 1 is a block diagram illustrating a configuration of a vehicle according to an embodiment.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of machine parts. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistance system (DAS) 100.

The EMS 11 may control the engine 10 in response to an acceleration intention of the driver through an accelerator pedal or a request of the DAS 100. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels sensed at a time of braking the vehicle 1 (anti-lock braking systems: ABS). The EBCM 31 may selectively release braking of the wheels in response to over-steering and/or under-steering sensed at a time of steering the vehicle 1 (electronic stability control: ESC). In addition, the EBCM 31 may temporarily brake the wheels in response to a slip of the wheels sensed at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-speed travelling or parking and the steering force is increased during high-speed travelling.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The DAS 100 may assist the driver in manipulating (driving, braking, and steering) the vehicle 1. For example, the DAS 100 may sense a surrounding environment of the vehicle 1 (e.g., another vehicle, a pedestrian, a cyclist, a lane, a road sign, and the like), and control driving and/or braking and/or steering of the vehicle 1in response to the sensed environment.

The DAS 100 may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The DAS 100 includes a camera module 101 that acquires image data of the surrounding of the vehicle 1 and a radar module 102 that acquires object data of the surrounding of the vehicle 1. The camera module 101 may include a camera 101a and an electronic control unit (ECU) 101b, and photograph at least one of the front or the lateral side of the vehicle 1 and recognize another vehicle, a pedestrian, a cyclist, a lane, a road sign, and the like. The radar module 102 may include a radar 102a and an ECU 102b, and acquire a relative position, a relative velocity, and the like of an object of the surrounding of the vehicle 1 (e.g., another vehicle, a pedestrian, a cyclists, and the like).

The driver assistance system 100 is not limited to the one shown in FIG. 1, and may further include a LiDAR that scans around the vehicle 1 and detects an object.

The above described electronic components may communicate with each other through vehicle communication network NT. For example, the machine parts may transmit data through Ethernet, media oriented systems transport (MOST), Flexray, controller area network (CAN), local interconnect network (LIN), and the like. For example, the DAS 100 may transmit a driving control signal, a braking signal, and a steering signal to the EMS 11, the EBCM 31, and the EPS 41, respectively.

Figure 2:
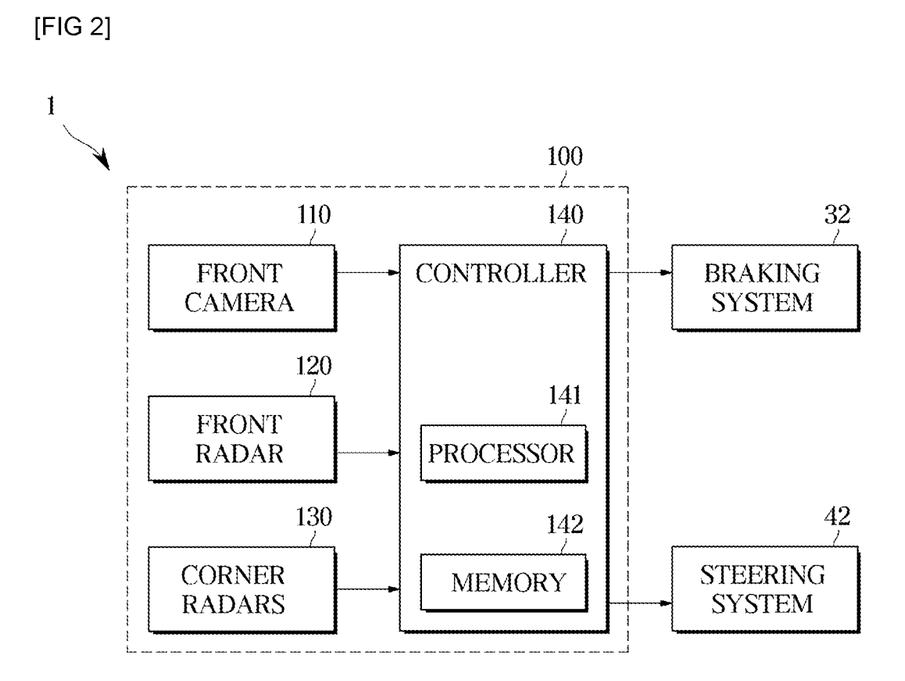
FIG. 2 is a block diagram illustrating a configuration of a driver assistance system according to an embodiment.
Figure 3:
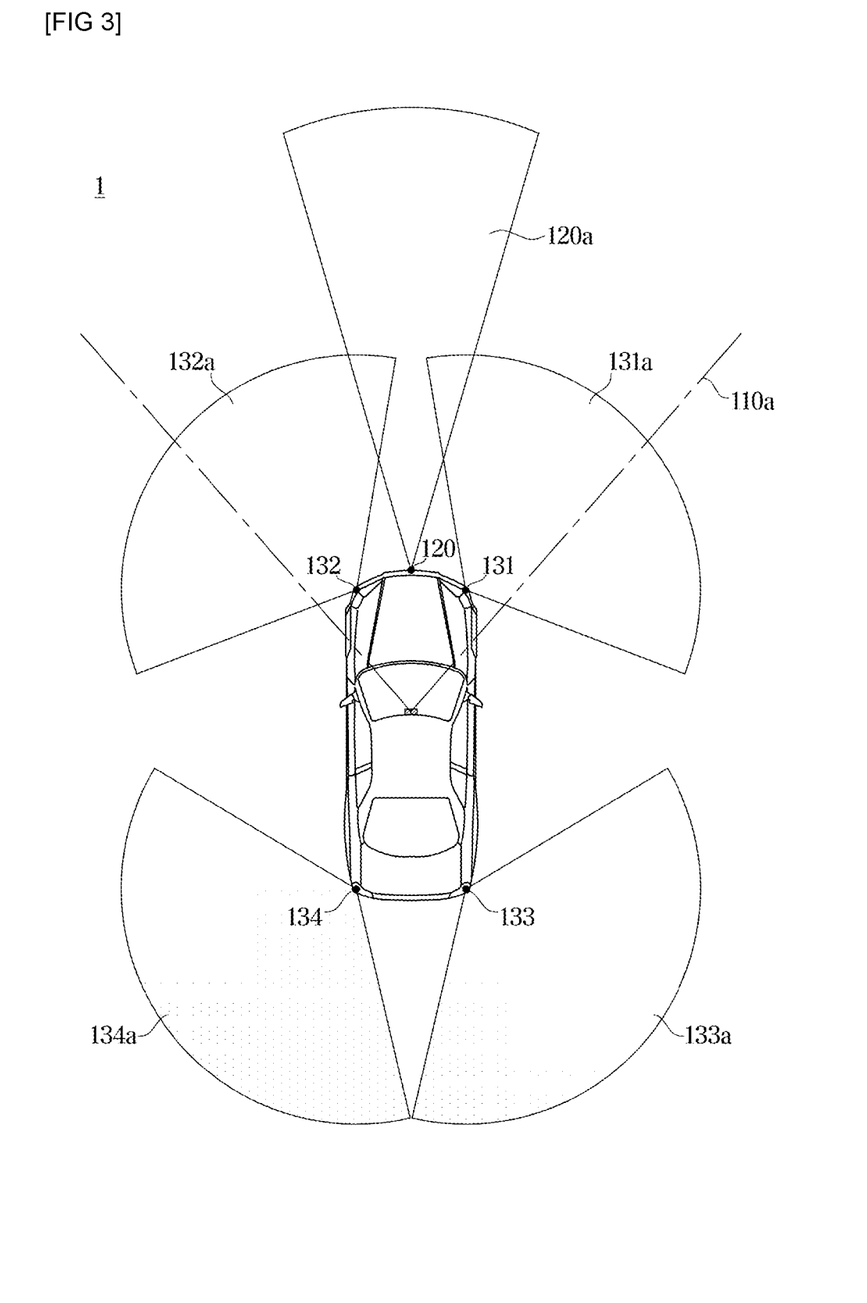
FIG. 3 is a diagram illustrating the operation of a camera and a radar included in a driver assistance system of a vehicle according to an embodiment.

FIG. 2 is a block diagram illustrating a configuration of a DAS according to an embodiment. FIG. 3 is a view illustrating a camera and a radar included in a DAS according to an embodiment.

Referring to FIG. 2, the vehicle 1 may include a braking system 32, a steering system 42, and a DAS 100.

The braking system 32 includes the EBCM (31 in FIG. 1) and the braking device (30 in FIG. 1), which have been described with reference to FIG. 1, the steering system 42 includes the EPS (41 in FIG. 1) and the steering device (40 in FIG. 1).

The DAS 100 may include a front camera 110, a front radar 120, and a plurality of corner radars 130.

The front camera 110 may have a field of view 110a facing the front of the vehicle 1 as shown in FIG. 3. The front camera 110 may be installed, for example, on the front windshield of the vehicle 1.

The front camera 110 may photograph the front of the vehicle 1 and acquire image data of the front of the vehicle 1. The image data of the front of the vehicle 1 may include position information of another vehicle, a pedestrian, a cyclist, or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit image data in front of the vehicle 1 to the controller 140.

The front radar 120 may have a field of sensing 120a facing the front of the vehicle 1 as shown in FIG. 3. The front radar 120 may be installed, for example, on a grille or bumper of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may acquire front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object on the basis of the phase difference (or time difference) between the transmission radio waves and the reflected radio waves, and calculate the relative velocity of the object on the basis of the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed toward the front right side of the vehicle 1 as shown in FIG. 3. The first corner radar 131 may be installed on the right side of the front bumper of the vehicle 1, for example. The second corner radar 132 may have a field of sensing 132a directed toward the front left side of the vehicle 1, and may be installed on the left side of the front bumper of the vehicle 1, for example. The third corner radar 133 may have a field of sensing 133a directed toward the rear right side of the vehicle 1 and may be installed on the right side of the rear bumper of the vehicle 1, for example. The fourth corner radar 134 may have a field of sensing 134a directed toward the rear left side of the vehicle 1 and may be installed on the left side of the rear bumper of the vehicle 1, for example.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and velocity information regarding another vehicle, a pedestrian, or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1.

Each of the first, second, third, and fourth corner radars 131, 132, 133 and 134 may be connected to the controller 140 through a vehicle communication network NT, a hard wire, or a printed circuit board, for example. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101b in FIG. 1) of the camera module (101 in FIG. 1) and/or the ECU (102b in FIG. 1) of the radar module (102 in FIG. 1), and/or an integrated ECU.

The controller 140 includes a processor 141 and a memory 142.

The processor 141 may process the front image data of the front camera 110, the front radar data of the front radar 120 and the corner radar data of the plurality of corner radars 130, and generate a braking signal and a steering signal for controlling the braking system 32 and the steering system 42. For example, the processor 141 may include an image signal processor for processing front image data of the front camera 110 and/or a digital signal processor for processing radar data of the radars 120, 130 and/or a micro control unit (MCU) for generating a braking signal and a steering signal.

The processor 141 may sense objects (e.g., another vehicle, a pedestrian, a cyclist, and the like) front of the vehicle 1 on the basis of the front image data of the front camera 110 and the front radar data of the front radar 120.

In detail, the processor 141 may acquire position (distance and direction) and relative velocity of the objects in front of the vehicle 1 on the basis of the front radar data of the front radar 120. The processor 141 may acquire position (direction) and type information (for example, whether the object is another vehicle, a pedestrian, or a cyclist) of the object in front of the vehicle 1 on the basis of the front image data of the front camera 110. In addition, the processor 141 allows the object sensed by the front image data to match the object sensed by the front radar data, and acquires the type information, the position, and the relative velocity of the front objects of the vehicle 1 on the basis of a result of the matching.

The processor 141 may generate a braking signal and a steering signal on the basis of the type information, the position, and the relative velocity of the front objects.

For example, the processor 141 calculates a time to collision (TTC) between the vehicle 1 and the front object on the basis of the position (distance) and the relative velocity of the front object, and warns the driver of a collision or transmits a braking signal to the braking system 32 on the basis of a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) on the basis of the relative speed of front objects, and warn the driver of a collision or transmit a braking signal to the braking system 32 on the basis of a result of comparing the DTC with distances to the front objects.

The processor 141 may acquire position (distance and direction) and relative velocity of the objects on the sides of the vehicle 1 (front right, front left, rear right, and rear left) on the basis of corner radar data of the plurality of corner radars 130.

The processor 141 may transmit a steering signal to the steering system 42 based on the position (distance and direction) and relative velocity of the objects on the sides of the vehicle 1.

For example, when a collision with a front object is determined based on the time to collision or the distance to the collision, the processor 141 may transmit a steering signal to the steering system 42 to avoid collision with the front object.

The processor 141 may determine whether to avoid a collision with a front object by changing the driving direction of the vehicle 1 based on the position (distance and direction) and relative velocity of the lateral objects of the vehicle 1. For example, when there is no object located on the side of the vehicle 1, the processor 141 may transmit a steering signal to the steering system 42 in order to avoid a collision with a front object. When the collision with the lateral object is not predicted after the steering of the vehicle 1 based on the position (distance and direction) and the relative velocity of the lateral objects, the processor 141 may transmit a steering signal to the steering system 42 in order to avoid a collision with a front object. When a collision with a lateral object is predicted after steering of the vehicle 1 based on the position (distance and direction) and relative velocity of the lateral objects, the processor 141 may not transmit the steering signal to the steering system 42.

The memory 142 stores programs and/or data for processing image data by the processor 141, programs and/or data for processing radar data by the processor 141, and programs and/or data for generating a braking signal and/or a steering signal by the processor 141.

The memory 142 may temporarily store the image data received from the front camera 110 and/or the radar data received from the radars 120 and 130, and may temporarily store a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

The DAS 100 is not limited to the one illustrated in FIG. 2, and may further include a LiDAR that scans around the vehicle 1 and detects an object.

As such, the controller 140 may transmit a braking signal to the braking system 32 on the basis of whether a collision with the front object is predicted to occur. When a side object is not present or a collision with a side object is not predicted to occur, the controller 140 may transmit a steering signal to the steering system 42 to avoid a collision with a front object. When a collision with a side object is predicted to occur after the steering, the controller 140 may not transmit the steering signal to the steering system 42.

'Lane', and 'line' to be mentioned in the following description may be defined as follows, respectively. A 'lane' means a part of the road on which a vehicle travels, separate from the sidewalk through which pedestrians pass. A 'lane' is a part of a road that is divided by lines so that a vehicle passes through a designated area in one line. A 'line' means a line drawn at regular intervals along the driving direction on the road the vehicle is traveling on. One 'lane' is a pair of left line and right line, and can be separated from other adjacent lanes by a line.

Figure 4:
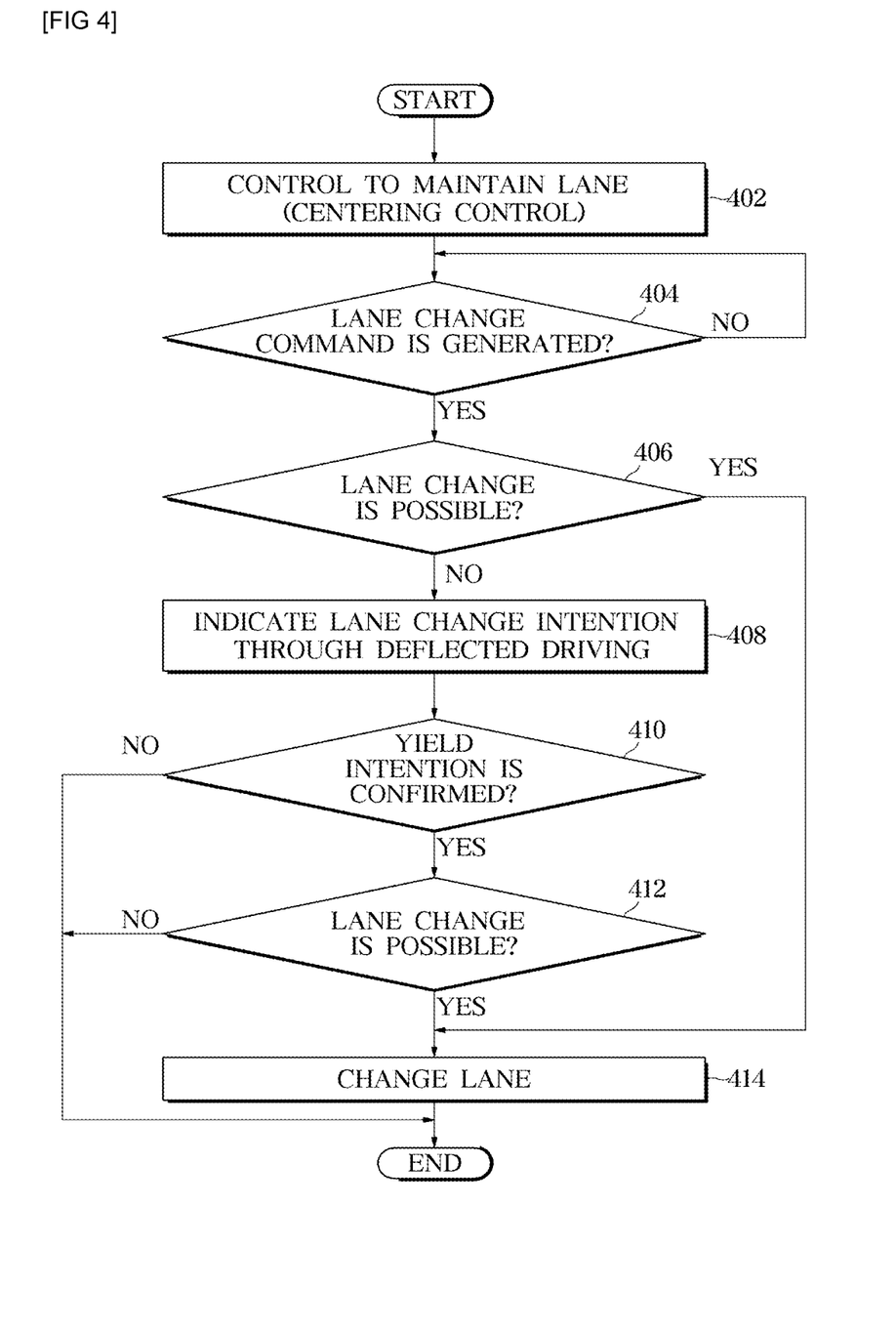
FIG. 4 is a diagram illustrating a control method of a vehicle according to an embodiment.

FIG. 4 is a diagram illustrating a control method of a vehicle according to an embodiment. According to the control method shown in FIG. 4, when the driver assistance system (ADAS) of the vehicle is activated and a lane change is requested even though it does not meet a predetermined lane change condition, 'deflected driving in the lane' is performed. Through this, lane change intention can be actively indicated to adjacent vehicles, and lane change can be made safely after confirming the yield/overtake intention of adjacent vehicles.

As shown in FIG. 4, the vehicle 1 (hereinafter referred to as own vehicle) according to the embodiment of the present disclosure prevents the vehicle from leaving the traveling lane based on the LKAS function of ADAS (maintains the lane), and performs centering control so that the vehicle 1 travels along the center of the lane without bias to the left or right of the lane (402).

Figure 5:
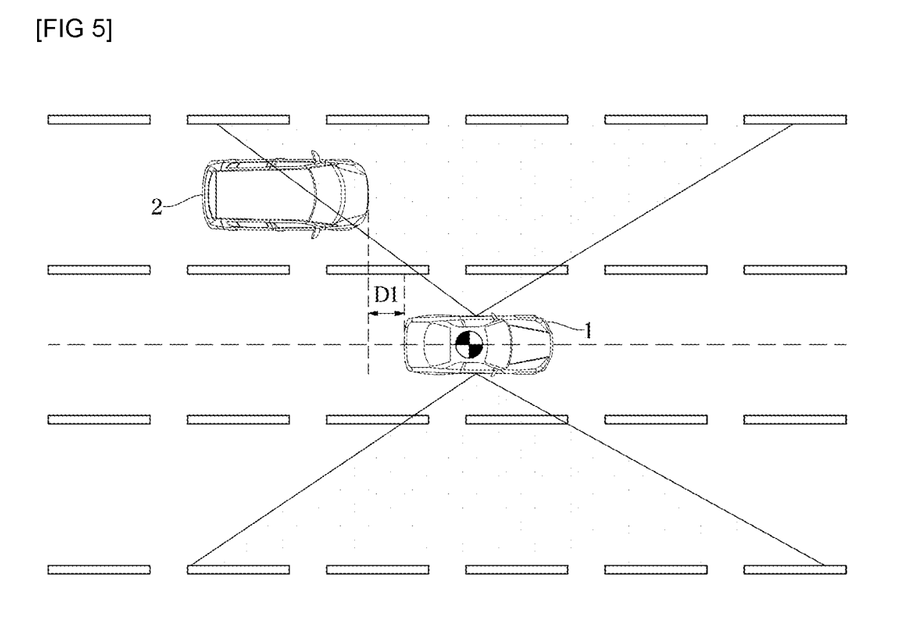
FIG. 5 is a diagram illustrating a driving state while performing lane maintenance and centering control of a vehicle according to an embodiment.

FIG. 5 is a diagram illustrating a driving state while performing lane maintenance and centering control of a vehicle according to an embodiment. As shown in FIG. 5, the 'centering control' means controlling the vehicle to travel along the center of the lane (refer to the imaginary line indicated by the dotted line) without bias to the left or right of the lane while preventing the vehicle from leaving the traveling lane based on LKAS function of ADAS. In FIG. 5, denoted by reference numeral 2 is another vehicle traveling in the adjacent lane to the left of the lane in which the own vehicle 1 is traveling.

Returning to FIG. 4, while the own vehicle 1 is traveling while performing lane maintenance and centering control, the DAS 100 confirms whether a lane change command is generated (404). The lane change command can occur when the own vehicle 1 needs to change lanes. For example, when it is necessary to change the lane from the inner lane of the road to the outer lane to exit the toll gate of the highway, or to exit from the main road to a branch road, a lane change command may occur.

When a lane change command occurs ('Yes' in 404), the DAS 100 identifies the surrounding situation of the own vehicle 1 and confirms whether a lane change is possible (406). For example, confirming whether another vehicle 2 is driving in the adjacent lane to be entered through the lane change and confirming whether there is enough space in the adjacent lane for the own vehicle 1 to enter by confirming the relative distance D1 and relative velocity between another vehicle 2 and the own vehicle 1.

If sufficient space is secured in the adjacent lane to be entered so that lane change is possible (YES in 406), the DAS 100 performs lane change through steering control of the own vehicle 1 (414).

On the contrary, if the lane change is impossible because there is not enough space in the adjacent lane to be entered ('No' in 406), the DAS 100 indicates a lane change intention to another vehicle 2 in the adjacent lane through 'deflected driving in the lane' (408).

Figure 6:
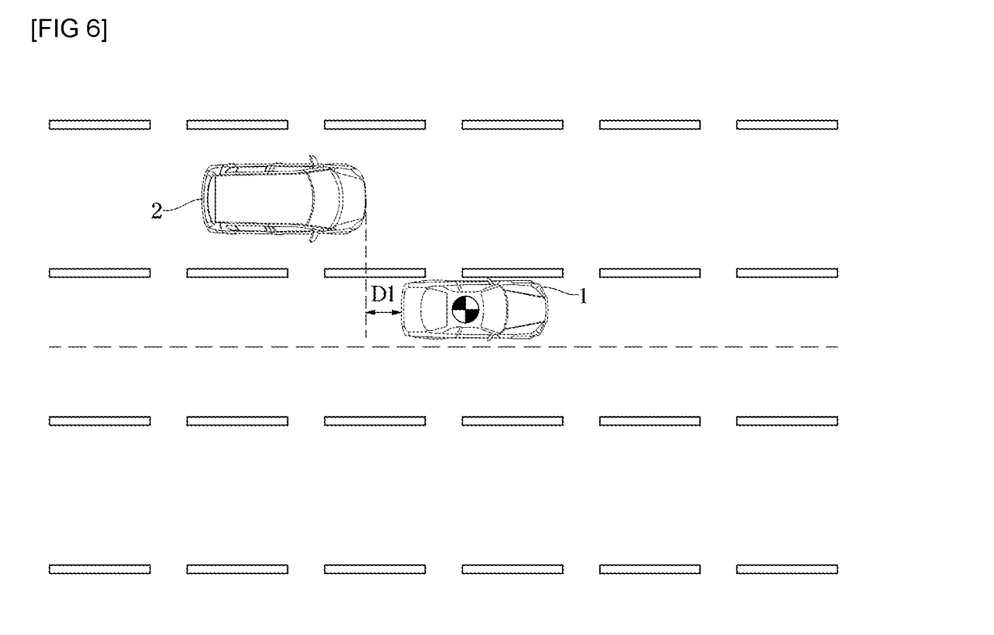
FIG. 6 is a diagram illustrating a deflected driving state in a lane of a vehicle according to an embodiment.

FIG. 6 is a diagram illustrating a deflected driving state in a lane of a vehicle according to an embodiment. As shown in FIG. 6, 'deflected driving in a lane' is a relative concept of the 'centering' as described above, and means controlling the vehicle to perform deflected driving toward the left or right line instead of the center of the lane without leaving the traveling lane based on the ADAS LKAS function. FIG. 6 shows a state in which the own vehicle 1 performs deflected driving toward the left line before attempting to change the lane to the adjacent left lane. In this situation, another vehicle 2 traveling in the adjacent lane can grasp the lane change intention of the own vehicle 1 through deflected driving in the left lane of the own vehicle 1. The driver of another vehicle 2 may secure a space for the own vehicle 1 in front of another vehicle 2 through deceleration in response to the indication of the lane change intention of the own vehicle 1 (Yield), and may also overtake the own vehicle 1 through acceleration.

Figure 7:
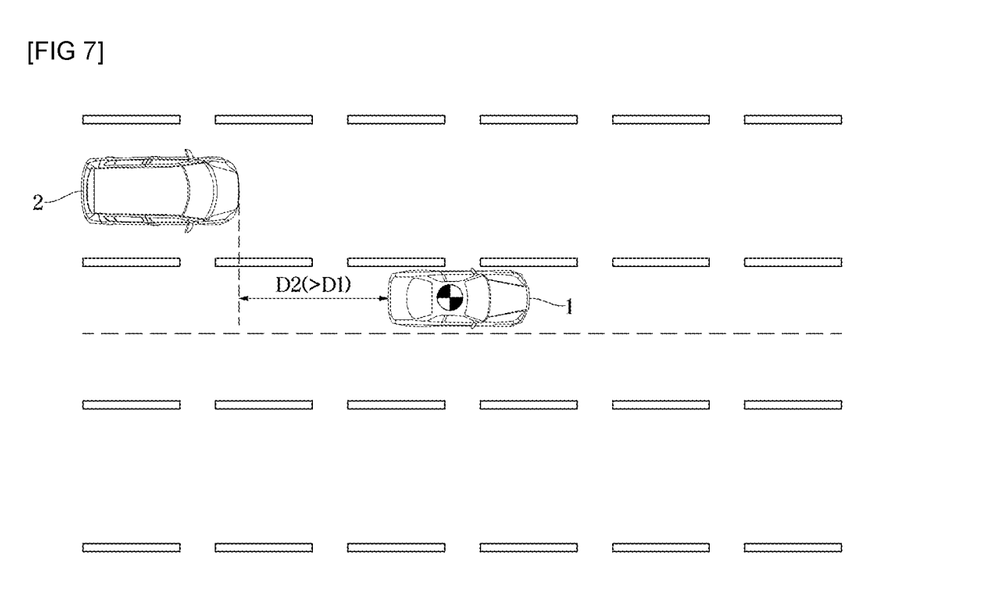
FIG. 7 is a diagram illustrating a case in which another vehicle indicates a yield intention through deceleration in response to a lane change intention indication of a vehicle according to an embodiment.

FIG. 7 is a diagram illustrating a case in which another vehicle indicates a yield intention through deceleration in response to a lane change intention indication of a vehicle according to an embodiment. As shown in FIG. 7, another vehicle 2 increases the relative distance D2 between the own vehicle 1 and another vehicle 2 through deceleration in response to the lane change intention indication of the own vehicle 1 and indicates the yield intention so that the own vehicle 1 can perform lane change through this.

Returning to FIG. 4, if the yield intention from the driver of another vehicle 2 is confirmed ('YES' in 410), the DAS 100 confirms once more whether a lane change is possible (412). When another vehicle 2 decelerates and a certain amount of space is secured in front of another vehicle 2 after the lane change intention of the own vehicle 1 is indicated, the DAS 100 of the own vehicle 1 can estimate that the driver of another vehicle 2 has a yield intention.

Figure 8:
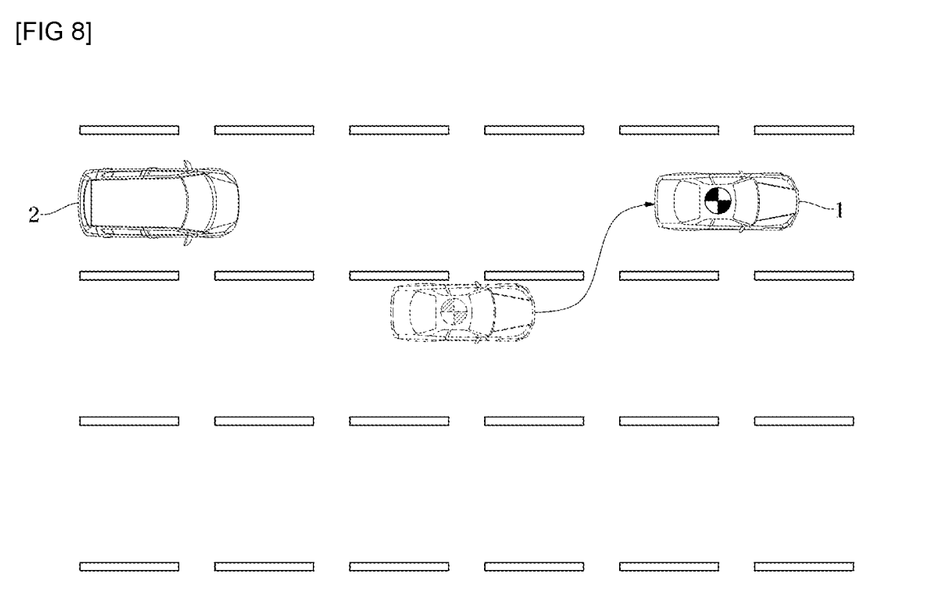
FIG. 8 is a diagram illustrating that a vehicle according to an embodiment performs a lane change through yield of another vehicle.

If there is enough space in the adjacent lane to be entered, and the lane change is possible ('Yes' in 412), the DAS 100 performs lane change through steering control of the own vehicle 1 (414). FIG. 8 is a diagram illustrating that a vehicle according to an embodiment performs a lane change through yield of another vehicle. In FIG. 8, another vehicle 2 created a sufficient space for the own vehicle 1 to be entered in front of another vehicle 2 through deceleration in response to lane change intention indication of own vehicle 1. In this way, when the lane change is made through the driver's yield of another vehicle 2, the DAS 100 of the own vehicle 1 may flash an emergency light a certain number of times to express gratitude for the yield to the driver of another vehicle 2 who gave way.

The disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The above description is merely illustrative of the technical idea, and a person with ordinary knowledge in the technical field of the present disclosure will be able to make various modifications, changes, and substitutions within the range not departing from the essential characteristics. Accordingly, the embodiments disclosed above and the accompanying drawings are not intended to limit the technical idea, but to describe it, and the scope of the technical idea is not limited by the embodiment and the accompanying drawings. The scope of protection should be interpreted by the scope of the claims below, and all technical ideas within the scope of the same should be construed as being included in the scope of the rights.

According to an aspect of the present disclosure, when a lane change is requested despite not meeting a predetermined lane change condition, the present disclosure provides a vehicle driver assistance system that can actively indicate lane change intentions to adjacent vehicles through 'deflected driving in a lane' and safely performs lane change after confirming the intention to yield/overtake adjacent vehicles.

What is claimed is:

1. A control method of a vehicle, the method comprising:
   confirming, while the vehicle is travelling along a center of a lane autonomously, that a space in an adjacent lane is not enough for the vehicle to enter based on both a relative distance and a relative velocity between the vehicle and another vehicle in the adjacent lane when a lane change command occurs;
   performing deflected driving in the lane of the vehicle to indicate a lane change intention when the space in the adjacent lane is confirmed to be insufficient for the vehicle to enter;
   confirming that the space in the adjacent lane is enough for the vehicle to enter based on both the relative distance and the relative velocity between the vehicle and another vehicle in the adjacent lane after a yield intention for the lane change intention is confirmed from another vehicle; and
   performing a lane change corresponding to the lane change command when the space in the adjacent lane is confirmed to be enough for the vehicle to enter.

2. The control method of claim 1, wherein the performing deflected driving in the lane comprises:
   driving the vehicle to be biased toward a left line or a right line of the lane without leaving the traveling lane.

3. The control method of claim 2, wherein the performing deflected driving in the lane comprises:
   when changing the lane to the left lane of the traveling lane, driving to be biased toward the left line of the traveling lane; and
   when changing the lane to the right lane of the traveling lane, driving to be biased toward the right line of the traveling lane.

4. The control method of claim 1, wherein the confirming the yield intention comprises:
   confirming the yield intention of another vehicle from increasing the relative distance between the vehicle and another vehicle through deceleration of another vehicle around the vehicle.

5. A vehicle comprising:
   a driver assistance system configured to control autonomous driving of the vehicle; and
   a controller configured to
   confirm, while the vehicle is travelling along a center of a lane autonomously, that a space in an adjacent lane is not enough for the vehicle to enter based on both a relative distance and a relative velocity between the vehicle and another vehicle in the adjacent lane when a lane change command occurs,
   perform deflected driving in the lane of the vehicle to indicate a lane change intention when the space in the adjacent lane is confirmed to be insufficient for the vehicle to enter,
   confirm that the space in the adjacent lane is enough for the vehicle to enter based on both the relative distance and the relative velocity between the vehicle and another vehicle in the adjacent lane after a yield intention for the lane change intention is confirmed from another vehicle, and
   perform a lane change corresponding to the lane change command when the space in the adjacent lane is confirmed to be enough for the vehicle to enter.

6. The vehicle of claim 5, wherein the deflected driving in the lane comprises:
   driving the vehicle to be biased toward a left line or a right line of the lane without leaving the traveling lane.

7. The vehicle of claim 6, wherein the deflected driving in the lane comprises:
   when changing the lane to the left lane of the traveling lane, driving to be biased toward the left line of the traveling lane; and
   when changing the lane to the right lane of the traveling lane, driving to be biased toward the right line of the traveling lane.

8. The vehicle of claim 5, wherein the controller is configured to confirm the yield intention of another vehicle from increasing the relative distance between the vehicle and another vehicle through deceleration of another vehicle around the vehicle.

9. A non-transitory computer-readable medium storing computer-executable instructions, which when executed by a processor, cause the processor to:

confirm, while the vehicle is travelling along a center of a lane autonomously, that a space in an adjacent lane is not enough for the vehicle to enter based on both a relative distance and a relative velocity between the vehicle and another vehicle in the adjacent lane when a lane change command occurs;

perform deflected driving in the lane of the host vehicle to indicate a lane change intention when the space in the adjacent lane is confirmed to be insufficient for the vehicle to enter;

confirming that the space in the adjacent lane is enough for the vehicle to enter based on both the relative distance and the relative velocity between the vehicle and another vehicle in the adjacent lane after a yield intention for the lane change intention is confirmed from another vehicle; and perform a lane change corresponding to the lane change command when the space in the adjacent lane is confirmed to be enough for the vehicle to enter.

10. The non-transitory computer-readable medium of claim 9, further storing instructions, which when executed by the processor, cause the processor to:

drive the host vehicle to be biased toward a left line or a right line of the lane without leaving the traveling lane.

11. The non-transitory computer-readable medium of claim 10, further storing instructions, which when executed by the processor, cause the processor to:

when changing the lane to the left lane of the traveling lane, drive to be biased toward the left line of the traveling lane; and when changing the lane to the right lane of the traveling lane, drive to be biased toward the right line of the traveling lane.

12. The non-transitory computer-readable medium of claim 9, further storing instructions, which when executed by the processor, cause the processor to:

confirm the yield intention of another vehicle from increasing the relative distance between the host vehicle and another vehicle through deceleration of another vehicle around the host vehicle.

* * * * *